United States Patent [19]

Oehring et al.

[11] 4,048,452
[45] Sept. 13, 1977

[54] AUTOMATIC CALL DISTRIBUTION SYSTEM

[75] Inventors: Hans Oehring, Glen Ellyn; Philip Joseph Rossomando, Downers Grove, both of Ill.

[73] Assignee: Bell Telephone Laboratories, Incorporated, Murray Hill, N.J.

[21] Appl. No.: 690,995

[22] Filed: May 28, 1976

[51] Int. Cl.² .............................................. H04Q 3/64
[52] U.S. Cl. .................................................. 179/27 D
[58] Field of Search ......................... 179/27 D, 27 DB

[56] References Cited
U.S. PATENT DOCUMENTS

| 3,809,823 | 5/1974 | Jacobs et al. | 179/27 D |
| 3,842,215 | 10/1974 | Russell et al. | 179/27 D |
| 3,969,589 | 7/1976 | Meise et al. | 179/27 D |

Primary Examiner—William C. Cooper
Attorney, Agent, or Firm—Peter Visserman

[57] ABSTRACT

A telephone switching arrangement is disclosed incorporating means for automatically distributing calls among a plurality of groups of call answering consoles. In the disclosed arrangement, which may be part of a telephone central office or may be located in a remote location such as a customer's premises, a directory number and a queuing register are assigned to each group of call answering consoles. Incoming calls for a particular directory number are queued in the associated queuing register and when a console of the assigned group of consoles is available, a connection is established to the available console from the line or trunk associated with a call in the queuing register. The time in queue for each call is measured and compared against upper and lower time thresholds. When the measured time in queue of a call exceeds the upper threshold, that call will be directed to an answering console associated with another directory number provided that the measured time in queue for the oldest call in the queuing register assigned to that directory number is less than the lower time threshold.

11 Claims, 4 Drawing Figures

AUTOMATIC CALL DISTRIBUTION SYSTEM

BACKGROUND OF THE INVENTION

The invention relates to a telephone system and more particularly relates to a system for distributing calls from incoming lines among groups of telephone answering consoles of the basis of call holding times.

In many telephone applications, incoming calls are answered from attendant's consoles which perform designated functions. For example, an airline may have designated directory numbers for reservations, rate and schedule information, and general information. A group of telephone answering consoles and attendants generally is provided for each such function.

Prior art systems are known in which incoming calls directed to a specified directory number having a group of associated call answering consoles, are distributed to the consoles as consoles become available. This is sometimes referred to as automatic call distribution. Some prior art systems employ so-called "call-waiting" queues and incoming calls are identified in a queuing register. While an incoming call is waiting, a periodic announcement may be made to the caller requesting that the caller wait for service. A call-waiting queuing register is necessarily limited in size by the number of spaces allocated and when no further spaces are available, a busy tone must be supplied to the calling line. The busy condition or unreasonably long waiting times before a calling customer is served, clearly should be avoided whenever possible as either of these may well result in the loss of a customer or prospect. As a practical matter, however, it will be too expensive to provide a queue which is insufficiently large to accommodate all calls that may occur under peak traffic conditions. Similarly, it is impractical to provide a sufficient number of consoles and console attendants to handle all incoming calls within a prescribed period of time, under peak traffic conditions. It may be anticipated that the demand on the various groups will differ substantially from time to time. Accordingly, it is desirable to be able to transfer some of the incoming traffic from one group of attendant consoles to another group to minimize waiting time and equalize the work load. In one prior art system, a transfer from one console group to another is effected only when all of the circuits associated with the corresponding attendant consoles of one group are fully occupied and the other group has no calls waiting. Such an arrangement, however, has limited application since it is operative to transfer calls under the specific conditions mentioned and does not take into account the length of time that customers are kept waiting.

SUMMARY OF THE INVENTION

It is an object of this invention to provide an automatic call distribution arrangement wherein calls are uniformly distributed among groups of call answering consoles and to minimize delay to the calling party while maintaining high attendant efficiency.

It is another object of the invention to provide an automatic call distribution arrangement wherein calls directed to a first group of attendant consoles are automatically routed to attendant consoles of a second group when the work load of the first group is greater than that of the second group.

It is a further object of this invention to provide an automatic call distribution arrangement wherein calls directed to a first group of attendant consoles are automatically routed to attendants of a second group of consoles when the waiting time for calls directed to the first group exceeds a specified upper limit and the waiting time for the second group is below a specified lower limit.

In accordance with this invention, all incoming calls to a directory number having one or more attendant consoles, are handled by means of a single queue. As attendant consoles become available, the calls on the queue will be served on a first-in first-out basis. When an incoming call arrives in the queue, a notation of its arrival time is made and the elapsed time since arrival is checked periodically. Two time thresholds, also referred to as time triggers herein, are established for each queue by the system's user. A first threshold is referred to as the in-flow trigger. The condition wherein the holding time of the oldest call in a queue is less than the in-flow trigger, is taken as an indication that attendants, also called servers, are less than fully occupied. The second threshold is referred to as the out-flow trigger. The condition wherein the holding time of the oldest call on queue exceeds the out-flow trigger is taken as an indication that the servers associated with the queue are fully occupied and fully occupied and a transfer of some of the work is desirable. Means are provided for distributing work from a queue whose servers are working at a high level of occupancy to servers of another queue working at a lower level of occupancy.

In a telephone switching system a queue may comprise a register or like device for storing information identifying the calling lines which are to be connected to one of the consoles associated with the called directory number. In accordance with this invention, a queuing register is provided for each directory number having the automatic call distribution feature and for each incoming call to the directory number an entry identifying the calling line is made in the associated register. In addition to information defining the calling line, the time of entry in the queuing register is recorded. Logic circuitry is provided for computing the elapsed time since entry of any call and for comparing the elapsed time with the corresponding in-flow and out-flow time triggers. The holding time (i.e., the elapsed time since entry) of the oldest call of each queuing register is computed from time to time and compared with the time triggers. The system is responsive to signals generated as a result of the comparing operation to establish a connection from a calling line identified in the queuing register associated with a first directory number to a server associated with a second directory number. Such a transfer of work will take place in the presence of logic signals indicating that the holding time of the oldest call of the first queuing register is greater than its out-flow trigger and the holding time of the oldest call of the second queuing register is less than its in-flow trigger. A telephone switching system may have a substantial number of queuing registers and each such register may be assigned to an alternate server pool. Alternate server pools are defined by the states of registers which identify the queuing registers to which a specific group of servers may lend help. The selection of an alternate server is done automatically by the switching controller on the basis of criteria supplied by the system's user and is independent of the actions of the server occupying the call answering console.

The above and other objects and features of this invention are illustrated in the following description in which reference is made to the accompanying drawings.

DETAILED DESCRIPTION

In a telephone system employing automatic call distribution, calls to a specified directory number are distributed among several call answering consoles, preferably on a first-come first-served basis. The equipment for distributing the incoming calls to the consoles assigned to respond to calls to the particular directory number may be located either on the customer premises or in the telephone central office. For the purposes of this discussion it is assumed that the apparatus is in the central office and forms part of the telephone central office switching system. The telephone central office will perform the normal call handling functions such as, detecting originations, providing dial tone, receiving dial pulse signals, providing audible ringing to the calling party, etc.

Figure 1:
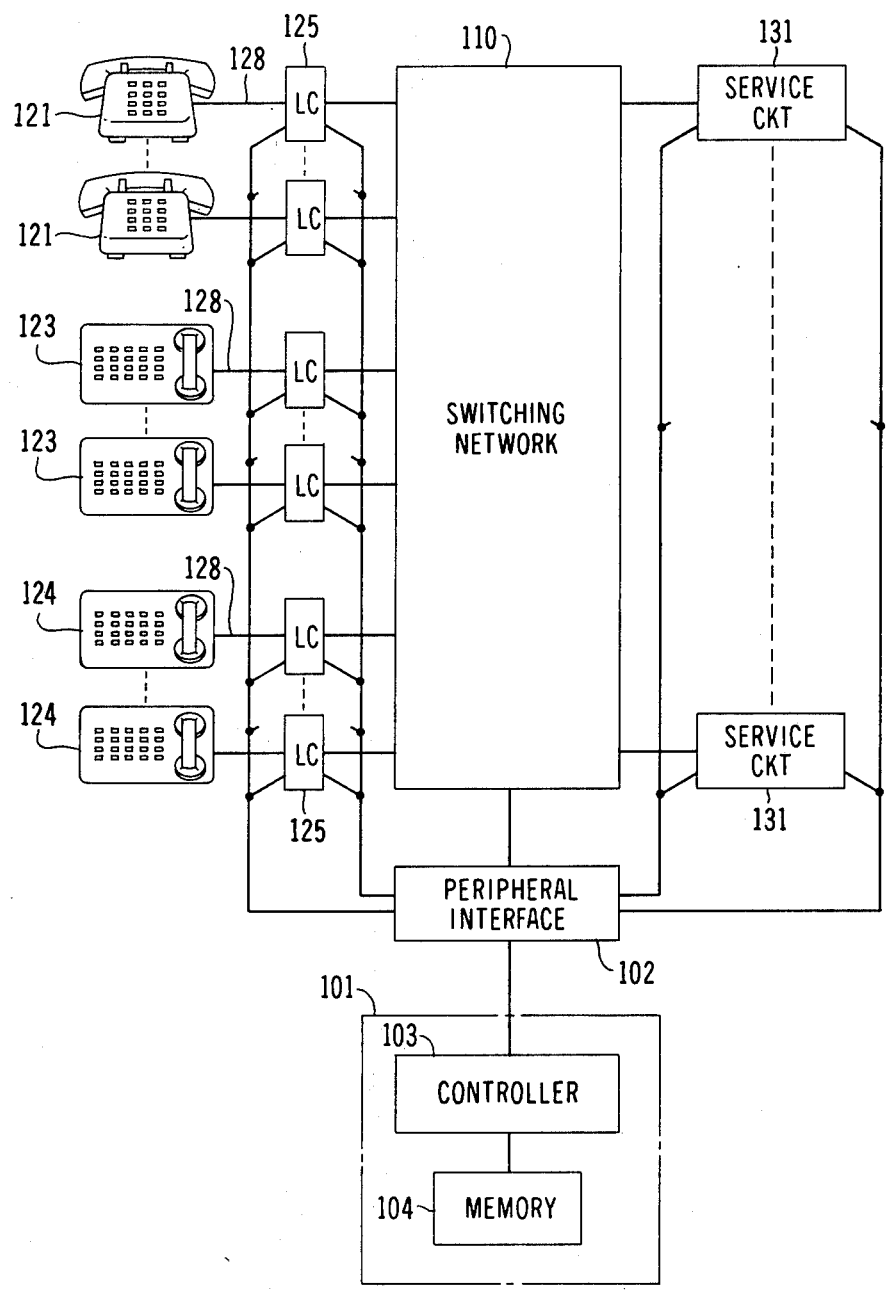
FIG. 1 is an illustrative block diagram of a telephone switching system having call answering consoles.

A telephone switching system in a general block diagram form is shown in FIG. 1. A number of subscriber lines 128 are shown to be ultimately terminating on the switching network generally represented by 110 in FIG. 1. A system to which the invention has applicability may have several call answering sets or consoles. FIG. 1 depicts a group of call answering consoles indicated by 123 and a group of call answering consoles indicated by 124. A plurality of such groups may exist depending upon the number of directory numbers having automatic call distribution. Subscriber sets 121 and the call answering consoles are connected to line circuits 125 which are monitored and controlled from the peripheral interface circuit 102. A plurality of service circuits 131 are shown connected to the switching network 110 to enable the system to perform such functions as providing audible ringing, receiving dial pulse signals, etc. The switching network 110 and the service circuits 131 are also monitored and controlled from the peripheral interface circuit 102. A central processor 101, comprising a controller 103 and a memory for storing a control program and/or data, receives status signals from the interface circuit 102. On the basis of the information represented by these signals and the course of actions defined by the design of the central processor 101, control signals are transmitted to the interface circuit 102 defining signals to be applied to the network and the line and service circuits.

Central processor controlled telephone switching systems generally capable of performing the customary telephone switching functions, are disclosed in U.S. Pat. No. 3,570,008 of R. W. Downing et al. and the *Bell System Technical Journal,* Vol. XLIII, Number 5, September, 1969.

In the subsequent description the routine telephone functions of a system such as generally represented herein will not be discussed in detail as such are known in the art. Only the functions and apparatus required to implement the invention and the operation of such apparatus will be discussed. In the illustrative embodiment described herein, a queuing register is provided for each directory number having automatic call distribution and an entry is made for each incoming call to the directory number. A further register is provided which stores a busy-idle indication for each server assigned to the queuing register and a talking connection is established from a calling line to a server when a server becomes available. As an incoming call is received and information identifying the calling line is entered in the queuing register and the current state of a counter, which will be referred to herein as the time-of-day counter, is recorded. From time to time the recorded state is compared with the current state of the counter. From the comparison a measure of elapsed time or holding time is established and compared with the aforementioned in-flow and out-flow time triggers. In the event that the holding time of the oldest call recorded in the queuing register is greater than the out-flow trigger, an out-flow signal identifying the queue is generated and recorded in a common register which is associated with a group of queues. In the event that the holding time of the oldest call recorded in the queuing register is less than the in-flow trigger, the common register will be consulted. In the event that the common register contains the identity of an associated queuing regiter, a call from the identified queuing register will be served by a server of the queue having the short holding time.

Figure 2:
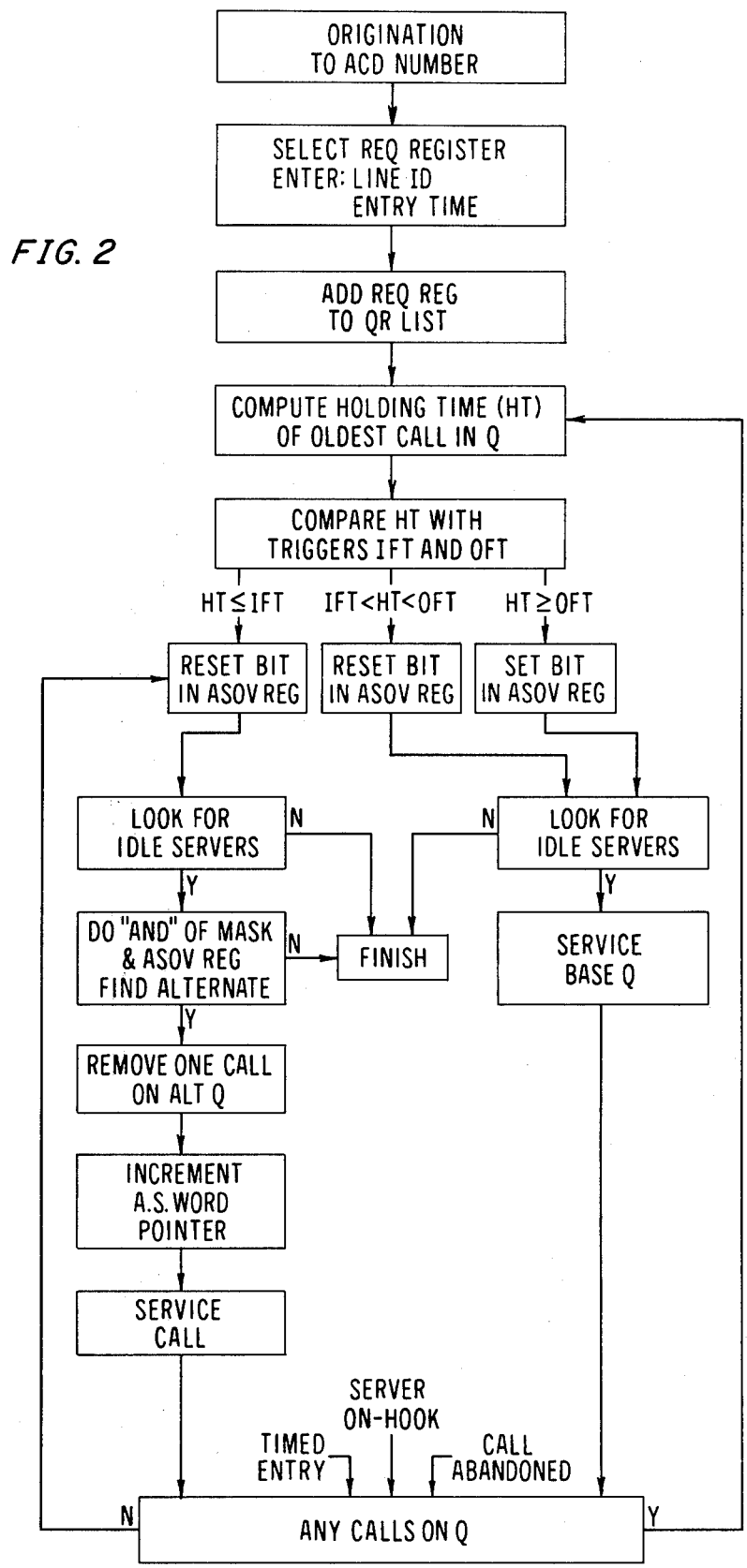
FIG. 2 is a sequence chart setting forth in general terms the sequence of actions in the illustrative system.
Figure 3:
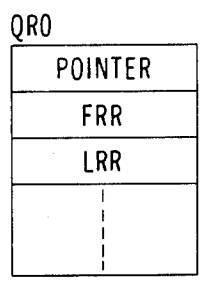
FIG. 3 represents the contents of a plurality of registers in the illustrative system.
Figure 3:
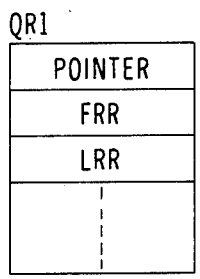
Figure 3:
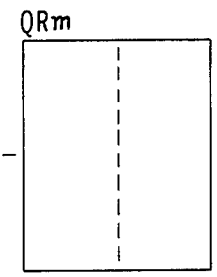
Figure 3:
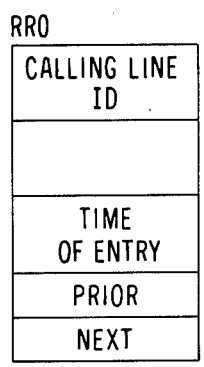
Figure 3:
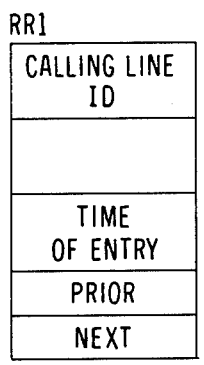
Figure 3:
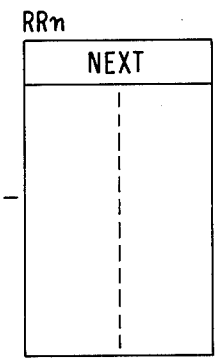
Figure 3:
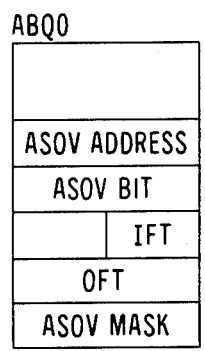
Figure 3:
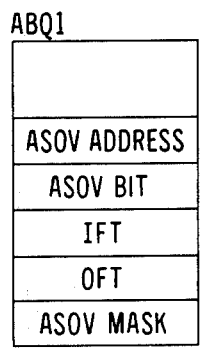
Figure 3:
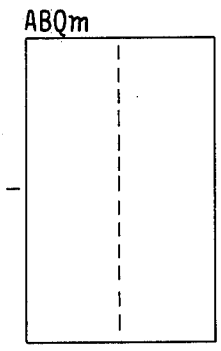
Figure 3:
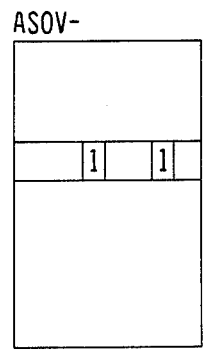
Figure 3:
Figure 3:
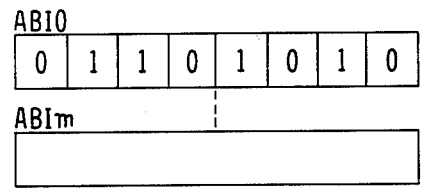

A sequence chart is employed as shown in FIG. 2 to illustrate the features of the invention. The sequence chart sets forth the sequence of events which are carried out in the course of distributing incoming telephone calls to servers in accordance with the present invention. FIG. 3 represents storage registers for storing significant information pertaining to the handling of calls in the illustrative system. Such storage registers may be areas in a random access memory or registers and flip-flops in a controller.

Whether such registers form part of a controller or of memory is immaterial to the invention. For the sake of convenience, however, the various registers referred to in FIG. 3 will be assumed to be in the random access memory 104, of FIG. 1. The controller 103 accesses the memory which comprises a program memory 402 and a data memory 403, shown in FIG. 4. The controller 103 comprises a memory access circuit 408 and memory buffer registers 405 and 413. A decoder 404 decodes instruction words read from memory and in response to input signals from a sequencing circuit 406, generates the necessary control signals which dictate the operation of the controller, including memory addressing and internal gating and logic functions. A clock circuit 420 provides the system timing signals. Registers, decoders, clock circuits and sequencing circuits are known from the aforementioned U.S. Pat. No. 3,570,008 and *Bell System Technical Journal* and other published materials.

In the system described herein, a queuing register arrangement consists of primary registers referred to as the queue registers, for example, QR0 through QRm in FIG. 3, and a group of secondary registers referred to as request registers, for example, RR0 through RRn in FIG. 3. The request registers are members of a list of registers available for use with any queue register. A memory IRR contains the address of the first and last registers of a linked list of request registers. When several request registers are assigned to a queue register the registers are linked and the address of the first and last of the assigned request registers are stored in the queue register.

Referring further to FIG. 2, when a call is made from one of the subscriber sets 121 to a directory number having automatic call distribution, a request register, for example RRO in FIG. 3, is selected. The identity of the calling line, the identity of a queue register associated with the called directory number, and an indication representing the time of day obtained from the time-of-day counter 430 are entered in the request register. The selected request register is added to a linked list of request registers associated with the queue register.

Subsequently, the request register associated with the oldest call is read to obtain the recorded time of entry. By subtracting the value time of entry indication from the value of the present time of day indication, as described later herein, the holding time of the oldest call in the queue register may be determined. The computed holding time is compared with constants representing in-flow and out-flow triggers uniquely associated with the queue register. The subsequent sequence of actions to be taken is a function of the result of the comparison. In the event that the holding time is greater than the out-flow trigger, an entry is made in the alternate server register ASOV shown in FIG. 3, and a call from the base queue, will be served. The ASOV register comprises a plurality of bit positions, one for each queue register associated with the ASOV register. A logical 1 in the bit position associated with a queue register will be taken as an indication that a transfer of work is desired.

In serving telephone calls from a queue register, a determination must be made whether any of the attendant consoles associated with it are idle. If not, the sequence will be terminated, to be reinitiated at a subsequent time. Availability of servers will be determined on the basis of the state of a so-called busy/idle register for each queue register, referred to as the ABI register in this description and illustrated in FIG. 3. As attendant consoles are connected and disconnected through the switching network, the busy/idle register is updated. When an attendant console is idle and a call is waiting in the queue register the necessary alerting signals are applied to the console and, when the server answers, a connection from the incoming line to the server is established. The identity of the served call is removed from the queue register and the holding time of the oldest call in the queue register is again computed. In the event that the numerical value of the newly computed holding time is less than the out-flow trigger (OFT) and greater than the in-flow trigger (IFT), the ASOV bit will be reset and the next call in the base queue register will be served. When the condition is reached that there are no more calls in the queue register which require service, or if after computation of the holding time of the oldest call it is determined to be less than the in-flow trigger (IFT), the trouble bit in the ASOV register is reset and a call from an alternate queue will be served if necessary.

Each queue register has associated with it a memory register, for example, ABQO shown in FIG. 3. This register contains the address of a group of bits of the ASOV register and a mask work, as well as the time triggers IFT and OFT referred to earlier. The ASOV address points to the group of bits defining the alternate server pool of which the queue register is a member. Each bit position defines a specific queue register, and the mask word defines those alternate queues which may be aided by the servers of the queue register. The logical AND of the mask and the ASOV register bits is performed and the result will define queues which may be helped and which need help.

When the identity of an alternate queue needing help has been determined, the identity of the request register associated with the oldest call is obtained from the alternate queue register and the request register is removed from the alternate queue register list. The calling line identity is obtained from the request register and a connection is established from the calling line to an available server of the base queue.

A counter is provided which is incremented by the processors clock circuitry to produce an output signal approximately once every 6 seconds. The sequence of computing the holding time of the oldest call is initiated for each queue in response to the 6-second signal. Additionally, the sequence of computing the holding time of the oldest call in a queue is initiated when a call is added to the queue register, when a console changes from off-hook to on-hook, and when a calling party abandons the call. After each computation which indicates a holding time is less than the in-flow trigger, one call from an alternate queue is served. A pointer word is maintained in the queue register which contains information identifying the bit position in the ASOV register of the alternate queue that was last served. This pointer is incremented each time an alternate queue is served to avoid aiding only one alternate queue, when there are several queues requesting aid.

To aid in the understanding of the principles of the invention, the operation of the apparatus will be discussed with respect to an illutrative telephone call. It will be assumed that a call is placed from one of the subscriber sets 121 to the directory number asociated with the group of consoles 123, depicted in FIG. 1. Further, it will be assumed that a heavy traffic load has been presented to the queue register associated with consoles 123 and that a light traffic load has been presented to the queue register associated with consoles 124. The so-called "origination", which occurs when the receiver is lifted at the subscriber station, will be detected at the line circuit 125 by means of the peripheral interface 102. The change of state from on-hook may be detected by periodically scanning the incoming lines and comparing the present state of the lines with the state of the lines at the previous scanning operation. When the on-hook to off-hook transition is detected, a pulse receiver, which may be one of the service circuits 131 is seized and a connection is established through the switching network 110 from the incoming line to the pulse receiver. By means of the pulse receiver, the peripheral interface, and the processor 101, the dialed information is stored and translated. The system's translation data will specify the the called directory number is served by means of a queue register. As indicated in FIG. 2, the sequence of events dictates that a request register be selected. Generally, several such registers will be available for use and an idle register mut be selected. As mentioned earlier herein, a linked-list arrangement is used. The register IRR in FIG. 3, contains the identity or tag of the first available request register on the list. The processor 103, for example, may obtain the address of IRR from the program memory 402 or from an internal register, and address the data memory 403 to read the contents of the IRR. The contents of any memory location read from the data memory 403 will be received in the buffer memory 413 and may be gated to any internal register or the memory access 408 by means of buses 410 and 411 and the gate circuit 417. The identity or tag of the first available request register may be that of RRn shown in FIG. 3. This register will contain the address of the next available register in the linked list. The processor 103 will fetch the address of the next register from RRn and write that address in the register IRR, such that IRR will now point to the next register in the linked list as the first available register. After a request register such as RRn has been selected in the manner described, the identification of the originating line is stored in the request register together with data representing the time of entry. The time of entry is obtained from a time-of-day counter 430. The time-of-day counter may be a multibit counter which is incremented periodically, for example, approximately once every second, and which will recycle approximately once every 2½ hours. The state of the counter 430 is entered in the request register at the time that the request register is seized.

For the purposes of illustration, it will be assumed that QRO is the queue register associated with the directory number for the group of consoles 123. After a call to console group 123 has been received, a request register has been seized and the pertinent information has been entered in it, the identity of the request register is entered in QRO. The queue register will contain the tag of the first and last request registers relating to calls to be served. For reasons of reliability, each request register contains the address of both the preceding and the subsequent request register in the list. When a new request register is to be added to the queue, the tag of the last request register on queue (LLR) is entered in the new request register, and the identity of the new request register is entered in the queue register as the tag of the last register on the list. Additionally, the tag of the new request register is entered in the request register which was the last register on the list, as the tag of the next register.

Figure 4:
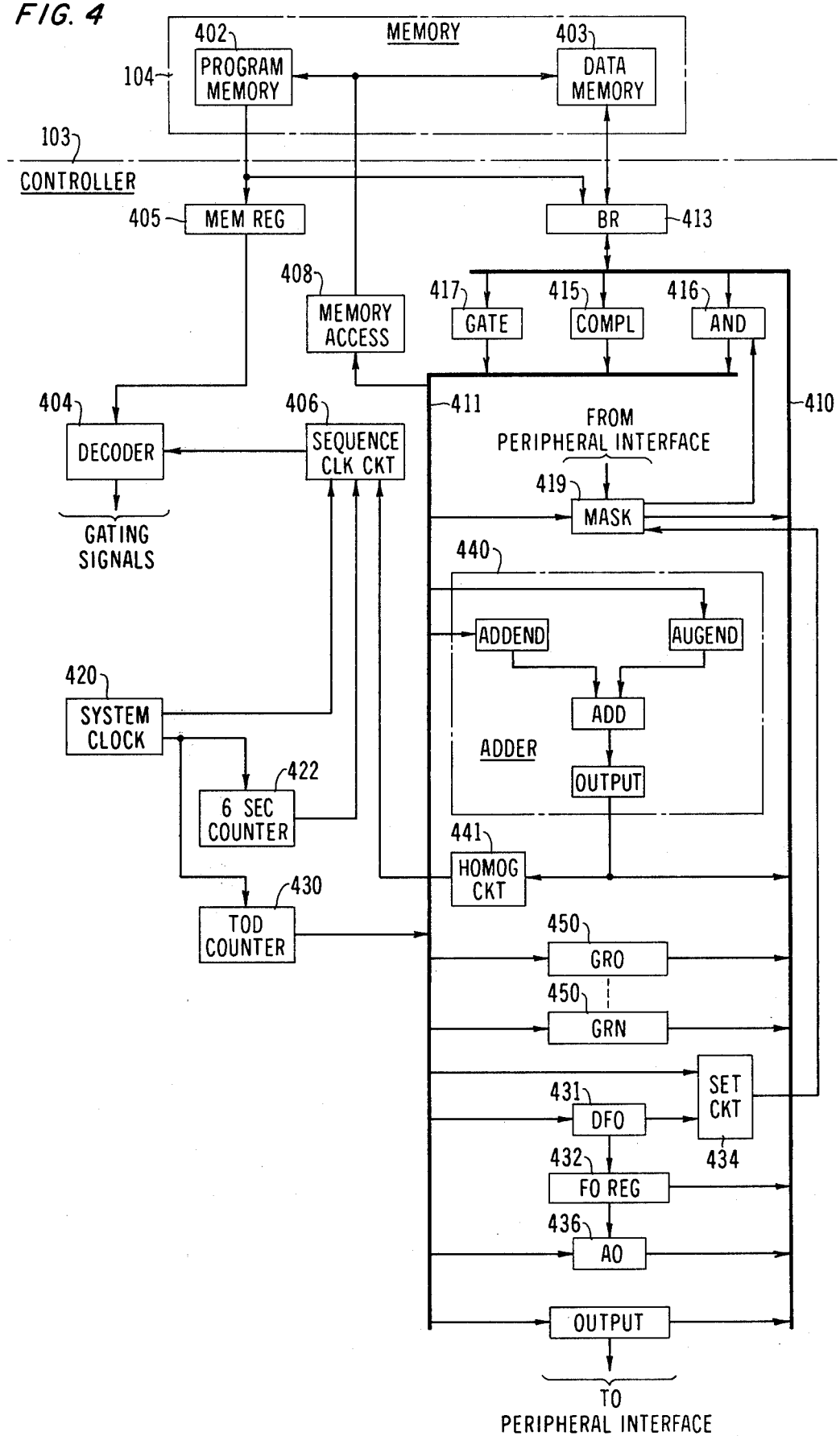
FIG. 4 is a block diagram of a controller for performing the various logic functions in the illustrative system.

The holding time of the oldest call associated with QRO is computed by reading the time of entry information from the request register identified in the queue register as the first request register (FRR). The numerical value represented by the time of entry information is subtracted from the numerical value specified by the output state of the time-of-day counter 430. It is well known, that subtraction of a binary number is equivalent to the addition of the complement of the number. To accomplish this calculation, the time of entry information as read from the data memory 403 is gated to the complement circuit 415 and the complemented data word is gated to the adder circuit 440 via the bus 411. The state of the time-of-day counter 430 is also gated to the adder circuit 440 and the two data words are added. Adder circuits are well known in the art and may consist of an ADDEND register, an AUGEND register, an ADD circuit, and an output register such as generally depicted in FIG. 4 and designated by the number 440. As indicated earlier herein, the time-of-day counter 430 will be reset or recycled periodically. To assure that elapsed time is properly calculated when the time of entry indicates a value of the counter just prior to recycling and the present time indicates a value subsequent to recycling, the absolute value of the elapsed time must be computed. This may be accomplished by inserting a logical one in the firt bit location beyond the most significant bit of the present value of the time-of-day counter, prior to the subtract (complement and add) operation. Other known methods of computing the absolute holding time or elapsed time may also be used.

As indicated generally in FIG. 2, the holding time is compared with an in-flow trigger (IFT) and an out-flow trigger (OFT). For QRO the numerical values representing these triggers are stored in register ABQO. The word containing OFT or IFT may be read from the program memory and gated to the adder 440. The previously computed holding time will have been stored in a register such as, for example, one of the general registers 450. The data word representing the computed holding time is gated via the bus 410, the complement circuit 415, and the bus 411 to the adder circuit 440 to be subtracted (addition of complement) from the time trigger. The result of the adding operation is examined by a homogeneity circuit 441 which detects whether the result of the adding operation is all zeros and whether the result is positive or negative. The state of the homogeneity circuit is provided to the sequencing circuit 416 and is used to initiate a sequence of operations. The specific sequence to be carried out will depend upon the results of the comparison of the holding time of the oldest call with the time trigger. It will be assumed that the holding time of the oldest call of QRO is equal to or greater than OFT. In that case, the bit in the ASOV register associated with QRO will be set. The location of the ASOV register and the bit position which is associated with QRO is stored in the register ABQO of FIG. 3.

In the sequencing of actions, the processor, after having set the bit in the ASOV register will proceed to service a call on the base queue. Before a call can be serviced, however, availability of an idle server must be checked. Accordingly, the busy/idle register ABIO, which is associated with QRO, must be read. The identity of the available server may be derived from the location of its associated bit in the queue. The contents of ABIO may be read from memory and gated to the adder 440. The rightmost 1 may be detected by the detect-first-one circuit 43 and the result of the detection identifying the rightmost 1 will be gated into the first-one register 432 and may be used to identify the first available server. The further serving of the base queue, requires that an alerting signal by supplied to the idle server, that QRO be updated, and that a talking connection be established from the calling party to the server when the server lifts the receiver. The function of supplying an alerting signal such as ringing, the server is an ordinary telephone function which need not be discussed in detail. Similarly, the functions of detecting the console's change from on-hook to off-hook and establishing a talking path from the calling party, whose line identity is stored in the request register identified by tag FRR in QRO, to the server are normal telephone functions. To update the queue register, the address of the next request register is obtained from the request register associated with the call being served, and this address is entered in QRO as tag FRR. Furthermore, the PRIOR tag in the next register to be served, which defines the address of the preceding register in the list, may now be zeroed to indicate that this is indeed the first register of the list. The request register associated with the call now being served may be returned to the list of available request registers defined by the register IRR discussed earlier herein and shown in FIG. 3. The details of adding a register to a linked list are well known and need not be described in detail. After a call has been served on the base queue, the queue register will be examined to determine whether there are any further calls to be served. If there are no further calls to be served, the tags FRR and LRR in the queue register will be set equal to zero. If thee are further calls to be served, the holding time will again be computed in the manner described before herein. It is assumed, for the sake of illustration, that the calling load to the directory number associated with consoles 124 is light. Further, for the illustration let it be assumed that the queue register QR1 is associated therewith and that it is examined as the result of a signal from the 6-second counter. Thus, the first three functional blocks of the sequence chart of FIG. 2 will be omitted. The first check that will be made is whether there are any calls waiting to be served from the queue register, i.e., whether FRR and LRR are equal to zero. Assuming that such is not the case, the holding time of the oldest call identified in the request register defined by FRR in QR1 will be computed in the manner described above. If the holding time is less than the trigger IFT obtained from ABQ1, the following sequence of events will take place. First, the bit in the ASOV register will be reset since it is not known at the time of execution of the sequence whether the bit was set the last time that the holding time was computed. As before, a determination must be made as to whether an idle server is available. If an idle server is available, it must then be established whether a call should be served from another queue. The address of the ASOV register associated with the pool to which QR1 belongs and to which for this illustration, QR0 also belongs, is found in ABQ1. Further, ABQ1 contains the ASOV mask word which specifically identifies the bits of the ASOV register corresponding to queue registers which may be served by the servers of QR1. To determine whether a call from another queue should be served, the contents of the mask word is obtained from ABQ1 and gated into the mask register 419. Thereafter, the contents of the designated location of the ASOV register are read and gated through the AND circuit 416 where the contents of the ASOV register are ANDed with the mask word. The resulting data word may then be used to derive the addresses of the queue registers corresponding to the queue register for which a bit was set in the ASOV register and which may be served by the queue being processed.

The resultant data word obtained after the performance of the logical AND function of the word from the ASOV register and the ASOV mask, is ANDed with another mask which will be referred to as the pointer mask. As mentioned earlier herein, a pointer is employed to assure that different alternate queues are served in the event that there are several queues that require assistance. The pointer mask is derived from the pointer word in QR1. The pointer represents a numerical value which is incremented after each time that an alternate queue is served. The pointer word may, for example, be a 4-bit word capable of defining numerical values from 0 through 15. The contents of the word are gated to the set circuit 434 to set the bit of the mask register corresponding to the numerical value defined by the pointer and all higher numbered bits, and to reset all lower numbered bits. Originally, the pointer will be all zeros and all bits of the mask register will be set. The previously noted resultant data word will have been stored in one of the general registers 450 and will be gated through the AND circuit 416 to be ANDed with the mask in register 419. The result will be gated on to the bus 411 and a first-one detector circuit 431 will detect the position of the rightmost 1 and store the identity thereof in register 432. The identity of the rightmost 1 will correspond to the address tag of the queue tag of the queue register to be served. In this example it will be assumed that the bit corresponding to QR0 was set in the ASOV register, that the bit was not blocked out by masking operations and that the bit was identified by the first-one detector circuit 431. Based on the detector circuit output stored in the register 432, the memory address of QR0 is derived. Even though the sequence was initiated by computation of the holding time of the oldest call associated with QR1, the controller will at this point in the sequence begin to serve a call from QR0. The address of the first request register FRR will be fetched from QR0 and the request register will be removed from the QR0 linked list and added to the linked list of available registers as described earlier herein. Additionally, the calling party identified in the request register originally associated with QR0 will be connected to an available server associated with QR1. In this manner work is transferred from QR0 to the servers of QR1.

One further action that is performed in the sequence of actions associated with the serving of a call from another queue is to increment the pointer which is used in derivation of the pointer mask discussed previously. The contents of the register 432 are gated to the add-one circuit where the numerical value of the pointer is incremented by 1. The incremented value will be stored in QR1.

If after servicing of one call from another queue register it is found that the base queue register is not empty, the call holding time will again be computed and compared with the time triggers as described above. In the event that there are no other calls waiting on the base queue, a call from another queue will again be served. In that case, the actions described above will be repeated and the pointer will again be used to generate a mask. In generating the pointer during the last alternate call serving operation, the bit position corresponding to the queue being served was incremented by 1. Hence, the new mask to be produced will contain 1s only in the positions beyond the bit corresponding to the earlier served queue register. In the event that the data word resulting from the ANDing operation with the mask is all zero, an all 1s mask will be generated in register 419. In the event that the next data work resulting from the ANDing operation with the mask is all 0s the sequence of actions will be terminated.

It will be understood that the above described system is merely an illustrative embodiment and that numerous other arrangements may be devised by those skilled in the art without departing from the spirit and scope of the invention.

What is claimed is:

1. Telephone call handling apparatus for use in combination with a plurality of telephone lines and a plurality of groups of call answering stations, and comprising:
   detection means for detecting from said lines dialing signals defining a called number identifying one of said groups of call answering stations;
   clock means for generating time signals defining present time;
   means for recording the identity of a line from which dialing signals defining a called number are detected by said detection means and for recording time signals generated by said clock means and representing time of request for said called number;

circuit means for comparing said recorded time signal with current time signals generated by said clock means, and for generating difference signals defining a time difference between said recorded time signals and said current time signals;

means for generating time trigger signals defining numerical constants representing first and second time triggers;

means for comparing said difference signals and said time trigger signals for generating a first output signal when the numerical value represented by said difference signals exceeds the numerical value of said first time trigger and for generating a second output signal when the numerical value represented by said difference signals is less than the numerical value of said second time trigger;

means responsive to said first output signal generated with respect to time of request for a first called number and said second output signal generated with respect to time of request for a second called number to connect a line from which dialing signals defining said first called number are detected to a call answering station of the group of call answering stations identified by said second called number.

2. A telephone call processing arrangement comprising:

first and second groups of telephone call answering stations;

a plurality of incoming lines;

means for detecting requests for connections to said stations from said incoming lines;

clock means for generating signals representative of present time;

interconnect means for selectively establishing talking path connections between said lines and said call answering stations in response to control signals;

register means for storing signals representative of the time of initiation of requests from said incoming lines;

means for generating signals defining numerical values representing an upper time trigger;

means responsive to said clock signals and said initiation time signals for generating elapsed time signals representing the time elapsed since initiation of request from a specified one of said lines;

comparing means for comparing said elapsed time signals and said signal representing said time trigger and for generating a first output signal when the elapsed time for a line requesting connection to a station of said first group exceeds said upper time trigger; and a controller responsive to said first output signal for generating control signals for controlling said interconnect means to connect a line requesting connection to a station of said first group to a station of said second group.

3. A telephone call processing arrangement in accordance with claim 2, and further comprising means for generating signals defining numerical values representing a lower time trigger, and wherein said comparing means generates a second output signal when the elapsed time for a line requesting connection to a station of said second group is less than said second time trigger, and said controller is responsive to said first and second output signals to generate control signals to control said interconnect means to connect a line requesting connection to a station of said first group to a station of said second group.

4. Telephone call answering apparatus comprising:
first and second call answering stations;
a plurality of incoming telephone lines;
an interconnecting circuit responsive to control signals for selectively interconnecting said lines and said stations;
detection means for detecting signals from said lines defining a request for connections to said stations;
a clock counter and means for periodically incrementing said clock counter;
first and second register means associated with said first and second stations respectively for storing the state of said clock counter when a request for connection to the associated station is detected by said detection means for storing the identity of the incoming line from which the request was detected;
means for computing the difference value between the numerical value of the current state of said counter and the states of said counter stored in said register means;
means for defining an upper numerical value and a lower numerical value for said difference value;
comparator means for comparing said difference value with said upper and lower numerical values and for generating an output signal when the difference value computed on the basis of a clock state stored in said first register exceeds said upper numerical value and the difference computed on the basis of a clock state stored in said second register is less than said lower numerical value;
controller means responsive to said output signal for generating control signals to control said interconnect means to connect an incoming line requesting connection to said first station to said second station.

5. Telephone call answering system comprising:
a switching network;
a plurality of telephone lines and a plurality of groups of call answering stations, each group having associated therewith a queuing register;
a clock counter and means for periodically incrementing said counter;
means for detecting requests for connection to said groups of stations from said lines and for storing in the queuing register associated with the group of stations to connection is requested, the identity of the requesting line and the state of said clock counter at the time that the request was detected;
logic circuit means for comparing the state of said clock counter stored in a queuing register and the actual state of the clock counter and for generating a data word representing the difference values between the actual state of said counter and the states of said counter recorded in said queuing registers;
register means for storing data words defining an upper and lower value for said difference value;
comparator means for comparing said data word defining said difference value with said data words defining said upper and lower values and for generating and recording a first output signal when the difference value exceeds said upper value and for generating a second output signal when said difference value is less than said lower value;
controller means responsive to said second output signal and said recorded first output signal to connect a line identified in a first queuing register to a call answering station of a group of stations associated with another queuing register.

6. An automatic call distribution system comprising:
a plurality of incoming lines;
a plurality of storage registers each being associated with a unique directory number;
a call answering station individually associated with each of said registers;
a clock counter for defining present time and means for periodically incrementing said counter;
means for detecting from said incoming lines signaling information defining called directory numbers and for storing in the one of said storage registers associated with the detected number the identity of the line from which the signaling information is detected, and the state of said clock counter at time of detection;
logic circuit means for comparing the current state of said counter with a prior state of said counter stored in one of said registers and for generating difference signals representing a value of elapsed time;
means for generating first and second trigger signals defining first and second predetermined values of elapsed time, respectively;
logic circuit means for comparing said difference signals generated with respect to a line identified in a specified one of said registers with said trigger signals and for generating a first output signal when the value represented by said difference signals is greater than the value represented by said first trigger signal and for generating a second output signal when the value represented by said difference signals is less than the value represented by said second trigger signal;
storage means for storing said first output signal generated with respect to a line identified in a first one of said registers;
means responsive to said second output signal generated with respect to a line identified in a second one of said registers and the state of said first output signal stored in said storage means to establish a telephone connection from a line identified in said first one of said registers to the call answering station associated with said second one of said registers.

7. The method of distributing telephone calls among call answering stations in an automatic call distribution system wherein calls directed to a first directory number are normally served by a first group of call answering stations and calls directed to a second directory number are normally served by a second group of call answering stations and wherein a plurality of storage registers and logic circuit means are provided, comprising the steps of:
storing in a first one of said registers the identity of calling lines from which signaling information defining said first directory number is detected and an indication of the time of such detection;
storing in a second one of said registers the identity of calling lines from which signaling information defining said second directory number is detected and an indication of the time of such detection;
generating signals of defining numerical constants representing first and second time triggers;
comparing said indications of time of detection for at least one line identified in said first register and for at least one line identified in said second register with signals representing current time and generating difference signals representing elapsed time since detection; and
comparing said difference signals with said time triggers and establishing a telephone connection from a line identified in said first register to a call answering station normally serving the calls directed to said second directory number when the difference signal representing elapsed time for said one line identified in said first register exceeds said first time trigger and the difference signal representing elapsed time for said one line identified in said second register is less than said second time trigger.

8. The method of distributing telephone calls among call answering stations in accordance with claim 7 wherein said steps of storing include identifying the entry in each register which has been stored longer than any other entry therein; and
wherein said step of comparing said indications of time of detection of said one line identified in said first register and said one line identified in said second register with said signals representing current time comprises performing said comparison with respect to the one line identified in said entry in each of said registers which has been stored longer than any other entry.

9. The method of effecting equalization of work among attendants of call answering stations in an automatic call distribution system wherein calls directed to a first directory number are normally served by a first group of call answering stations and calls directed to a second directory number are normally served by a second group of call answering stations and wherein a plurality of storage registers and logic circuit means are provided, comprising the steps of:
recording in said storage registers the identity of calling lines from which signaling information defining one of said directory numbers is detected and an indication of time of such detection;
generating signals defining numerical values representing upper and lower time triggers;
comparing said indications of time of detection for at least one line from which signaling information defining said first directory number was detected with signals representing current time and comparing said indications of time of detection for at least one line from which signaling information defining said second directory number was detected with signals representing current time and generating difference signals defining numerical values for the differences between said compared signals; and
establishing a telephone connection from a line from which signaling information defining said first directory number was received to a call answering station normally assigned to serve lines from which signaling information defining said second directory number is received when said signal defining the difference between said current time signals and said indications of time of detection for said one line from which information identifying said first directory number was received exceeds said first time trigger and said signal defining the difference between current time signal and said indications of time of detection for said one line from which information defining said second directory number was received is less than said second time trigger.

10. In a telephone call processing arrangement having a switching network, a plurality of incoming lines and a plurality of groups of call answering stations connectable to said network, and a controller for detecting signaling information from said lines and said stations and for controlling said network to selectively interconnect said lines and said stations and comprising storage register means and logic circuit means including:
- a first register associated with a first group of call answering stations for storing the identity of certain of said lines from which call signaling information has been received and signals representing time of receipt;
- a second register associated with a second group of call answering stations for storing the identity of others of said lines from which call signaling information has been received and signals representing the time of receipt;
- logic circuit means for generating signals defining current time;
- logic circuit means for generating trigger signals defining first and second time triggers; and
- logic circuit means for subtracting the value of said signals representing time of receipt from the value of said signals defining current time and for comparing the result of said subtraction with said trigger signals to generate a first output signal when said result exceeds said first time trigger and generating a second output signal when said result is less than said second time trigger;
- said controller being responsive to said first output signal generated with respect to a line identified in said first register and said second output signal generated with respect to a line identified in said second register to control said network to interconnect a line identified in said first register and a station of said second group of call answering stations.

11. In a program controlled call processing system having a switching network, a plurality of incoming lines and a plurality of groups of call answering stations connectable to said switching network, each of said groups of stations being associated with one of said groups of lines, and control means for detecting signaling information from said lines and said stations and for controlling said switching network to interconnect said lines and said call answering stations and comprising:
- clock means for generating time signals defining present time;
- register means for recording the identity of incoming lines from which call signaling information has been received and for recording therein signals representing time of receipt of call signaling information from an identified line;
- means for generating signals defining numerical values representing upper and lower time triggers;
- means for comparing said signals representing time of receipt of information and said signals defining present time to generate difference signals representing elapsed time since receipt of information, and for comparing said difference signals and said trigger signals to generate a first control signal when said difference signals for a line define a value greater than an upper time trigger and to generate a second control signal when said difference signals for a line define a value less than a lower time trigger;
- circuit means responsive to said first control signal generated with respect to a line of a first group of lines and said second control signal generated with respect to a line of a second group of lines to control said network to interconnect a line of said first group of lines to a station associated with said second group of lines.

* * * * *

UNITED STATES PATENT AND TRADEMARK OFFICE
CERTIFICATE OF CORRECTION

PATENT NO. : 4,048,452
DATED : September 13, 1977
INVENTOR(S) : Hans Oehring and Philip J. Rossomando It is certified that error appears in the above-identified patent and that said Letters Patent are hereby corrected as shown below:

In the Abstract, line 17, "another" should read --an other--. Column 1, line 34, "insufficiently" should read --sufficiently--. Column 2, line 24, after "occupied", first occurrence, delete "and fully occupied"; line 63, after "switching", insert --system--. Column 4, line 26, "regiter" should read --register--; line 64, after "memory", insert --register--. Column 5, line 28, "1" should read --"1"--; line 63, "work" should read --word--. Column 6, line 33, "illutrative" should read --illustrative--; line 55, "the", first occurrence, should read --that--; line 59, "mut" should read --must--. Column 7, line 66, "firt" should read --first--. Column 8, line 30, "sequencing" should read --sequence--; line 39, "1" should read --"1"--; line 40, "43" should read --431--; line 41, "1" should read --"1"--. Column 9, line 4, "thee" should read --there--. Column 10, line 1, "1" should read --"1"--; line 3, "1" should read --"1"--; line 4, "tag of the queue" should be deleted; line 29, "1" should read --"1"--; line 41, "1" should read --"1"--; line 42, "1s" should read --"1s"--; line 46, "1s" should read --"1s"--; line 47, "work" should read --word--; line 48, "0s" should read --"0s"--. Column 11, line 1, "signal" should read --signals--. Column 12, line 17, after "means", insert --and--.

Signed and Sealed this

Nineteenth Day of December 1978

[SEAL]

Attest:

RUTH C. MASON
Attesting Officer

DONALD W. BANNER
Commissioner of Patents and Trademarks